US006722842B1

(12) United States Patent
Sawdon et al.

(10) Patent No.: US 6,722,842 B1
(45) Date of Patent: Apr. 20, 2004

(54) END ARM MANIPULATOR (75) Inventors: Edwin G. Sawdon, St. Clair, MI (US); Brian D. Petit, Algonac, MI (US)

(73) Assignee: BTM Corporation, Marysville, MI (US)

( * ) Notice: Subject to any disclaimer, the term of this patent is extended or adjusted under 35 U.S.C. 154(b) by 542 days.

(21) Appl. No.: 09/006,248

(22) Filed: Jan. 13, 1998

(51) Int. Cl.$^7$ ................................................ B66C 1/00
(52) U.S. Cl. ...................... 414/729; 294/65; 294/81.21; 294/81.6
(58) Field of Search ............................ 414/729; 901/28, 901/29, 8; 294/81.2, 81.21, 81.5, 81.6, 65; 269/75, 45; 74/490.05, 490.06

(56) References Cited

U.S. PATENT DOCUMENTS

| | | | | |
|---|---|---|---|---|
| 2,310,025 A | * | 2/1943 | Giern et al. | 269/75 X |
| 2,488,296 A | * | 11/1949 | Kraus | 269/75 X |
| 4,214,739 A | * | 7/1980 | Dailey | 269/75 |
| 4,378,959 A | * | 4/1983 | Susnjara | 414/732 |
| 4,648,782 A | | 3/1987 | Kraft | |
| 4,739,241 A | * | 4/1988 | Vachtsevanos et al. | 901/28 X |
| 4,787,613 A | * | 11/1988 | Hayes | 269/75 |
| 4,898,490 A | | 2/1990 | Herbermann et al. | |
| 4,904,148 A | * | 2/1990 | Larsson | 901/28 X |
| 4,913,617 A | * | 4/1990 | Nicholson | 414/729 |
| 4,922,782 A | | 5/1990 | Kawai | |
| 5,020,323 A | * | 6/1991 | Hurlimann | 414/728 X |
| 5,071,309 A | * | 12/1991 | Herbermann et al. | 901/28 X |
| 5,135,276 A | * | 8/1992 | Blatt et al. | 294/65 |
| 5,152,566 A | * | 10/1992 | Blatt et al. | 294/81.2 |
| 5,165,670 A | | 11/1992 | Sawdon | |
| 5,171,001 A | | 12/1992 | Sawdon | |
| 5,190,334 A | | 3/1993 | Sawdon | |
| D338,384 S | | 8/1993 | Sawdon | |
| 5,261,715 A | | 11/1993 | Blatt et al. | |
| 5,271,651 A | | 12/1993 | Blatt et al. | |
| 5,286,159 A | * | 2/1994 | Honma | 901/8 X |
| 5,299,847 A | | 4/1994 | Blatt et al. | |
| 5,322,334 A | | 6/1994 | Hammer | |
| 5,383,738 A | | 1/1995 | Herbermann | |
| 5,516,173 A | | 5/1996 | Sawdon | |
| 5,647,625 A | | 7/1997 | Sawdon | |
| 5,733,097 A | * | 3/1998 | Herbermann et al. | 294/65 X |

FOREIGN PATENT DOCUMENTS

| | | |
|---|---|---|
| DE | 3244211 A1 | 5/1984 |
| FR | 79 08432 | 1/1981 |
| JP | 59-12590 | 1/1984 |

OTHER PUBLICATIONS

Derwent English Language Abstract for DE 32 44 211.
"Syro–Link™ Transfer Finger Tooling", Nov. 1, 1995, 6 pages.
2 photographs illustrating competitive end arm effector prior to Jan. 13, 1998.
BTM Corporation Booklet entitled "Locking Grippers", Sep. 1997, 27 pages.

* cited by examiner

*Primary Examiner*—Donald W. Underwood
(74) *Attorney, Agent, or Firm*—Harness, Dickey & Pierce, P.L.C.

(57) ABSTRACT

An end arm manipulator includes a base, an arm pivotably mounted to the base and a workpiece interfacing member coupled to the arm. In another aspect of the present invention, multiple arms are coupled to the base and are movable independent of each other. In still another aspect of the present invention, generally spherical balls are adjustably mounted between a clamping member and a cavity of the base.

39 Claims, 8 Drawing Sheets

END ARM MANIPULATOR

BACKGROUND AND SUMMARY OF THE INVENTION

This invention relates generally to workpiece interfacing apparatuses and more specifically to an end arm manipulator for retaining workpiece interfacing tools.

It is common to employ fluid powered grippers for engaging sheet metal workpieces. Such grippers are often movably mounted to a robotic or stationary support. Examples of such mounting arrangements are disclosed in the following U.S. Pat. No. 5,647,625 entitled "Gripper" which issued to Sawdon on Jul. 15, 1997; U.S. Pat. No. 5,383,738 entitled "Ball Jointed Links" which issued to Herbermann on Jan. 24, 1995; and U.S. Pat. No. 5,071,309 entitled "Mounting Arrangement for a Multi-Function Arm" which issued to Herbermann on Dec. 10, 1991.

Another traditional device is constructed of multiple, extruded metal rails bolted to a generally square shaped frame. The frame is centrally attached to a moving robotic arm. Hoses extend from the hollow, box section rails which are used as air manifolds. Pneumatically powered grippers are adjustably mounted to various points on the rails. However, these traditional devices are custom fabricated for each particular job, are costly to produce and labor intensive to set up. These traditional devices require excessive amounts of actuating fluid due to the indirect right angle mounting of components and due to the use of rails as manifolds. Such conventional units are also relatively heavy and inefficiently packaged thereby causing accurate repeatability concerns, and a circuitous routing of electrical and pneumatic lines which are prone to snagging on adjacent equipment or the workpiece.

In accordance with the present invention, the preferred embodiment of an end arm manipulator includes a base, an arm pivotably mounted to the base and a workpiece interfacing member coupled to the arm. In another aspect of the present invention, multiple arms are coupled to the base and are movable independent of each other. In still another aspect of the present invention, generally spherical balls are adjustably mounted between a clamping member and a cavity of the base. The arms are telescopically extendable in a further aspect of the present invention. Yet another aspect of the present invention provides a fluid powered gripping tool or locating tool mounted on either an end or intermediate portion of an arm. Another aspect of the present invention provides a fluid manifold function as an integral part of the base.

The end arm manipulator of the present invention is advantageous over conventional constructions in that the present invention is quickly and easily adjusted for different workpiece set ups utilizing single or multiple arms in standardized packages. This eliminates the cost of individual fabrications and is reusable for other jobs. The present invention is also much more rigid than traditional devices since the present invention manipulator's arms directly extend between a compact base and the workpiece, as compared to the traditional right angle geometry. The straight geometry construction of the present invention is also more easily packaged in a small work space while further shortening fluid lines and electrical lines. Moreover, the straight or direct geometry construction reduces the volume of fluid consumed compared to the conventional right angle and box framed structure. The majority of the electrical and fluid lines are also advantageously protectively contained within the arms. Additional advantages and features of the present invention will become apparent from the following description and appended claims, taken in conjunction with the accompanying drawings.

DETAILED DESCRIPTION OF THE PREFERRED EMBODIMENT

Figure 1:
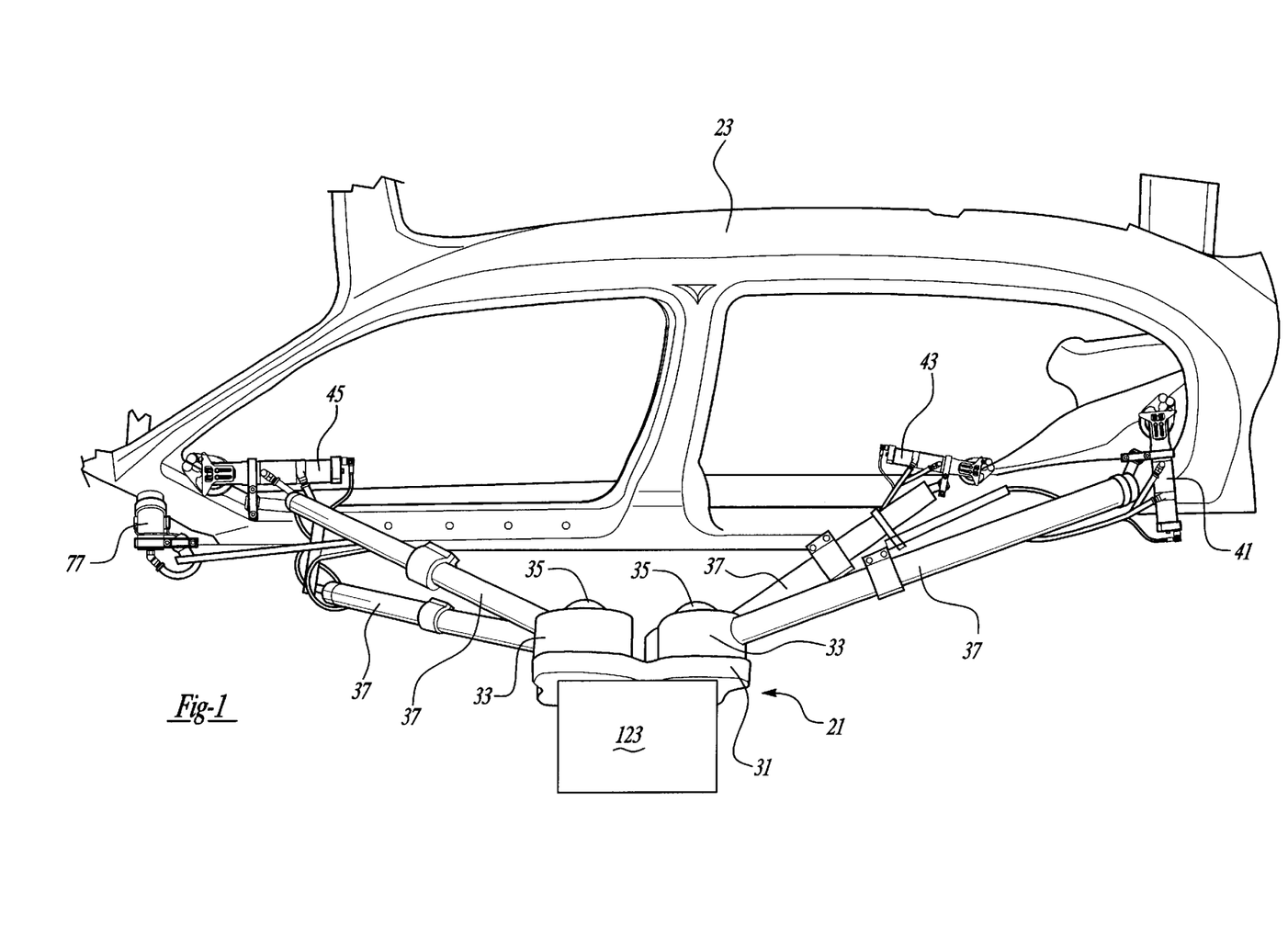
FIG. 1 is a perspective view showing the preferred embodiment of an end arm manipulator of the present invention gripping a workpiece.
Figure 2:
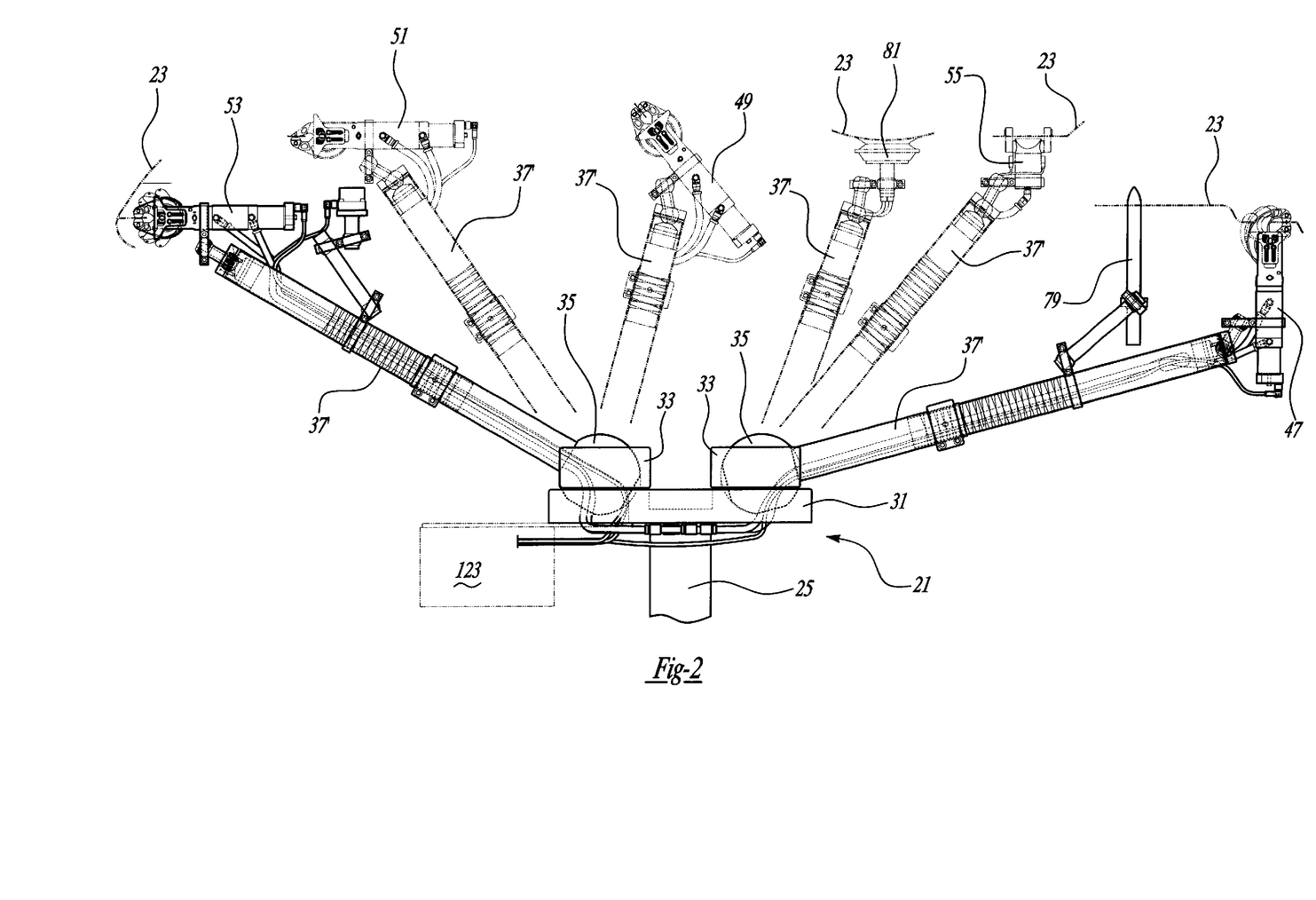
FIG. 2 is a side elevational view showing the preferred embodiment end arm manipulator in multiple positions and with multiple other preferred workpiece interfacing tools.

Referring to FIGS. 1 and 2, the preferred embodiment of an end arm effector or manipulator 21 is used to retain or transport a workpiece 23, such as a stamped steel, body side frame of an automotive vehicle, within a manufacturing plant. A robotic arm 25 is centrally bolted to end arm manipulator 21 for moving the manipulator and selectively engaged workpiece to various positions in the factory. Alternately, end arm manipulator 21 can be mounted to a manually moved support or stationary structure mounted to the factory floor.

End arm manipulator 21 includes an aluminum base 31, four aluminum clamp rings 33, four predominantly spherical balls 35, four telescoping arms 37 and workpiece interfacing tools as well as their associated mounts. Additional preferred arms 37'workpiece interfacing tools and their associated mounts are shown in FIG. 2. Exemplary preferred tool configurations include grippers 41, 43, 45, 47, 49, 51, 53 and 55, which each include a circular cylindrically shaped body 71 (see FIG. 9), an internally disposed pneumatic driven piston 73 and at least one moving jaw 75 for gripping the workpiece. Grippers 41–53 employ one or more pivoting jaws of the type known as the BTM PG-45 style flange gripper, double opening gripper or fixed gripper. Gripper 55 is of a parallel or box jaw type gripper known as the BTM SSLG style gripper. Other preferred workpiece interfacing tools include an electromagnetic coil proximity part-present sensor 77, a steel locator pin 79 and a vacuum cup 81.

The construction of base 31, clamp rings 33 and balls 35 can best be observed in FIGS. 3–6. Each clamp ring 33 is a C-shaped member having a side opening 101 and a top opening 103 through which arm 37 and a portion of ball 35 extend, respectively. Each clamp ring 33 further has an internal partially spherical cavity 105 for receiving the respective ball 35. Each corner of base 31 also has a partially spherical cavity 107 for receiving a corresponding ball 35. Bolts 109 are employed to loosely secure each clamp ring 33 to base 31, whereupon the corresponding ball trapped therebetween is pivotally adjusted to a desired orientation. After such a desired set up orientation is achieved, bolts 109 are tightened so as to secure and maintain the respective ball 35 and arm 37 in the final setup position. It should be appreciated, however, that each clamp ring 33 can be unbolted from base and rotated to many different rotational positions such that side opening 101 of each clamp ring 33 can be differently angled relative to base 31. If necessary, a dowel or screw can be inserted into aperture 121 in each clamp ring 33 for supplementally securing the corresponding ball 35 in its ultimately desired position.

A NEMA (National Electrical Manufacturers Association) box 123 is fastened to the bottom of base 31 for containing electrical line or wire connections and controllers. Furthermore, the robotic arm is bolted to a central area 125 of base 31.

Figure 4:
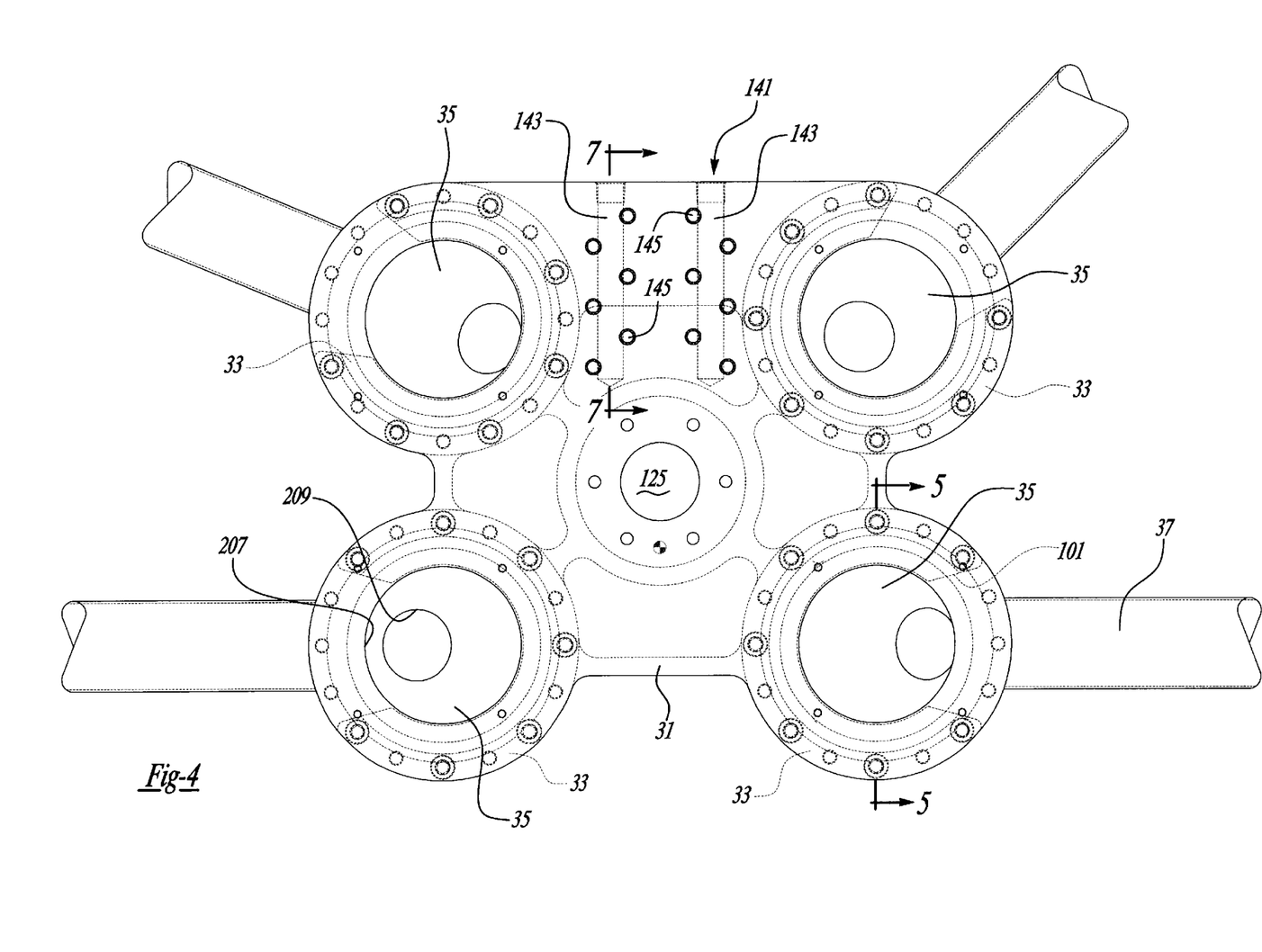
FIG. 4 is a fragmentary bottom elevational view showing the base, clamp rings, balls and arms employed in the preferred embodiment end arm manipulator.
Figure 5:
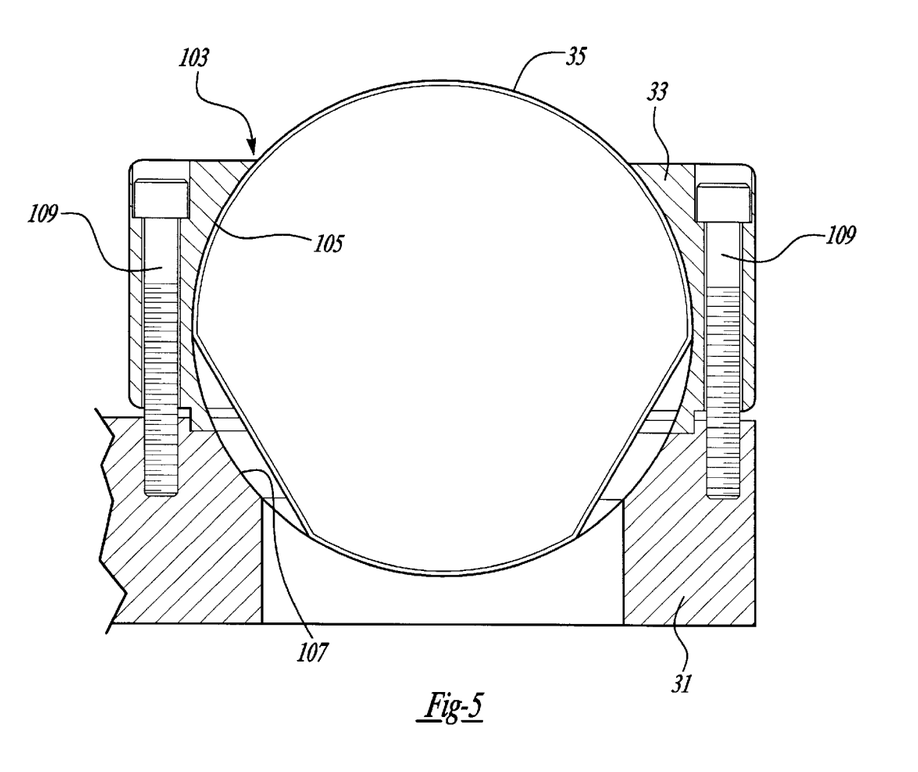
FIG. 5 is an enlarged cross sectional view, taken along line 5—5 of FIG. 4, showing the base, a clamp ring and a ball employed in the preferred embodiment end arm manipulator.
Figure 7:
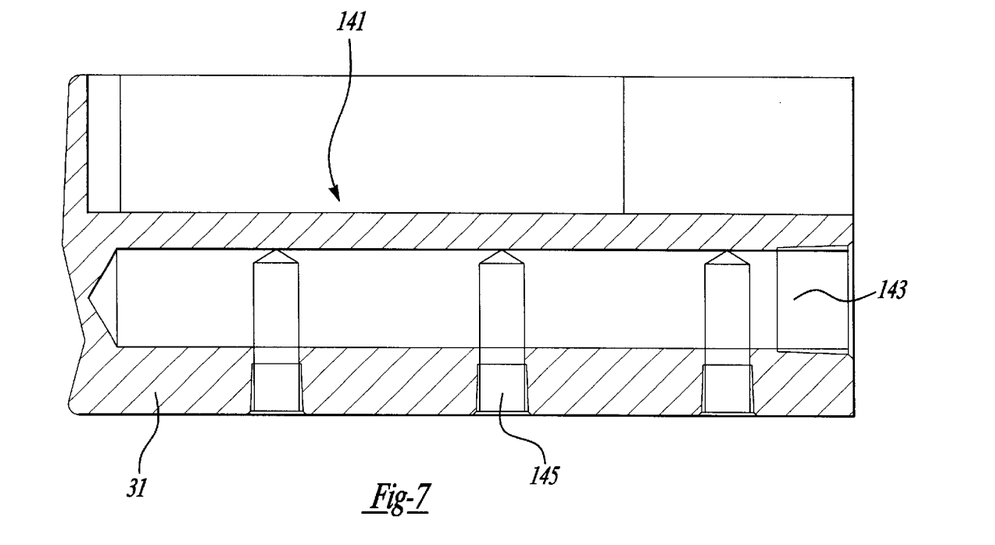
FIG. 7 is an enlarged cross sectional view, taken along line 7—7 of FIG. 4, showing the base employed in the preferred embodiment end arm manipulator.

A manifold portion 141 of base 31 can be seen in FIGS. 4 and 7. Manifold portion 141 is integral with base 31 and includes a pair of longitudinally elongated bores 143 and multiple transversely extending passageways 145 intersecting each bore 143. Bores 143 and passageways 145 are all drilled into base 31 although alternately, they may be integrally cast. It may be desired to thread the open ends of bores 143 and passageways to accept standard fittings. The main pneumatic fluid lines or hoses are coupled to the open ends of bores 143 while the individual tool pneumatic lines or hoses are connected to the open ends of respective passageways 145. Thus, manifold portion 141 of the present invention acts as a very compact, centralized and integral fluid receiving and distributing device.

Figure 3:
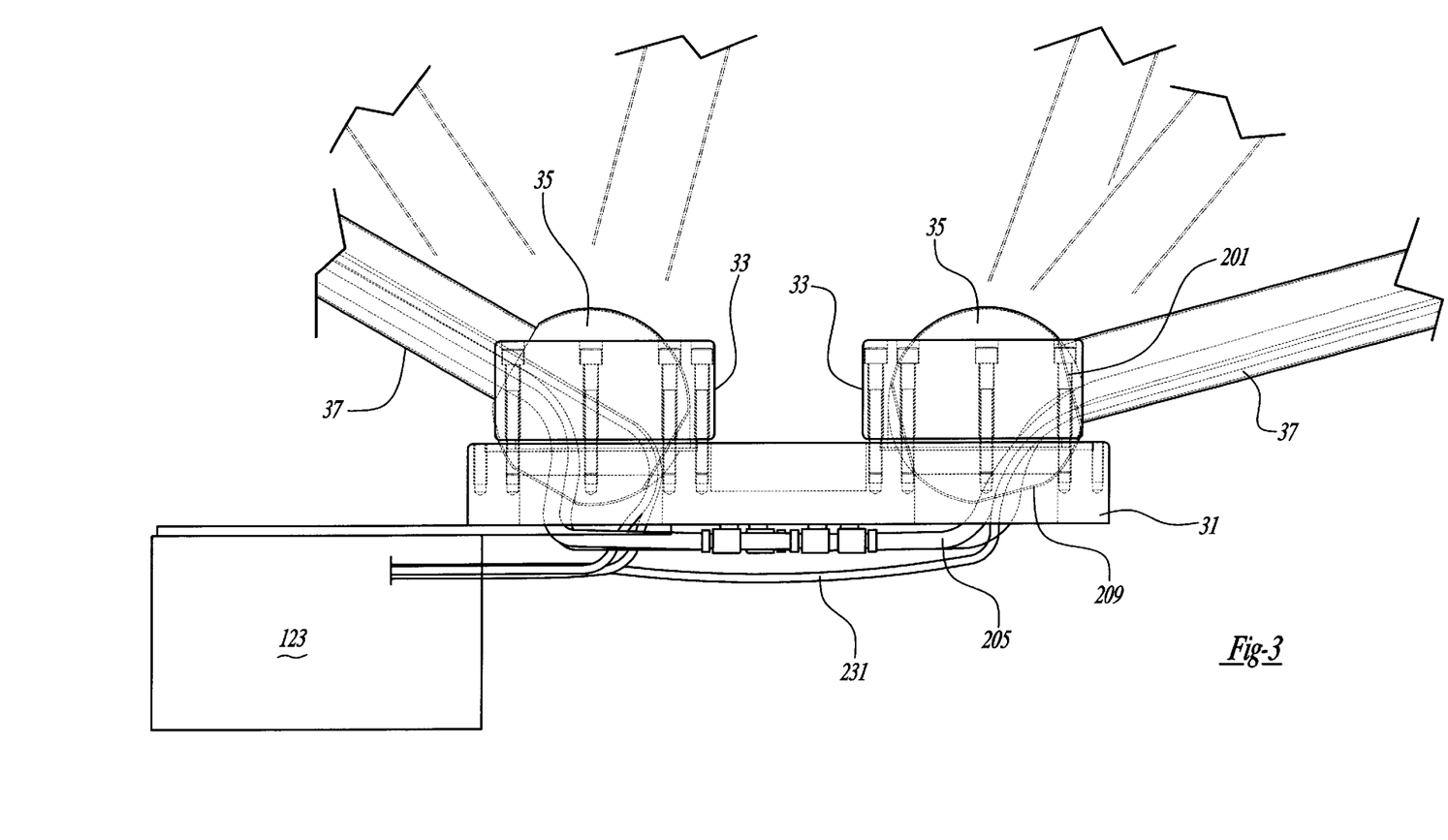
FIG. 3 is an enlarged and fragmentary side elevational view showing a base, clamp rings, balls and arms of the preferred embodiment end arm manipulator.
Figure 6:
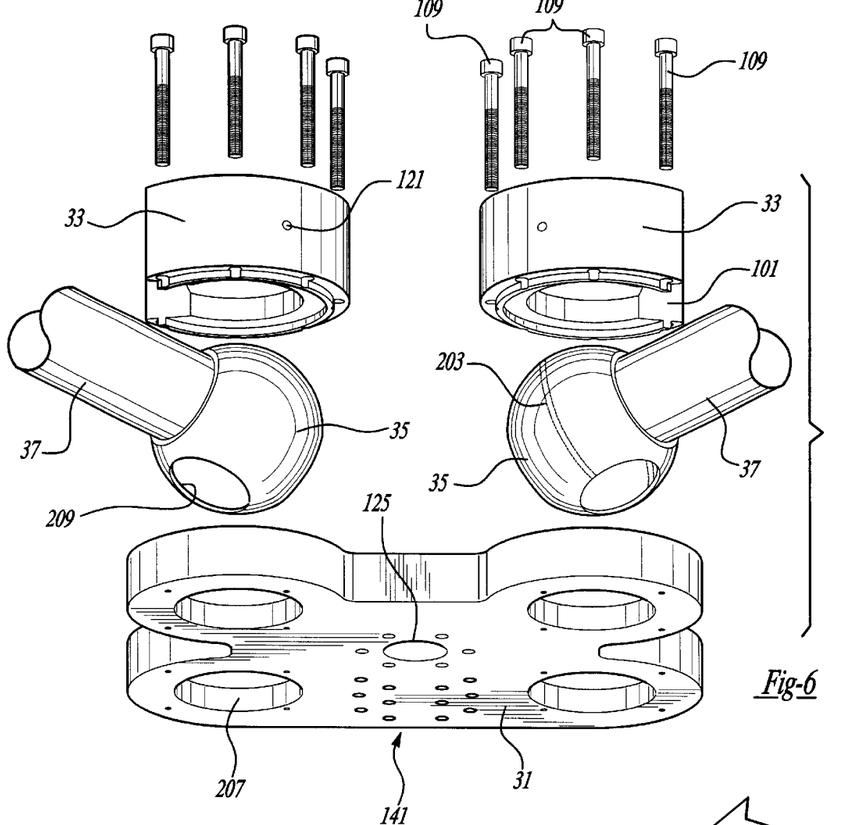
FIG. 6 is a fragmentary and exploded perspective view showing the clamp rings, balls, arms and base employed in the preferred embodiment end arm manipulator.
Figure 10:
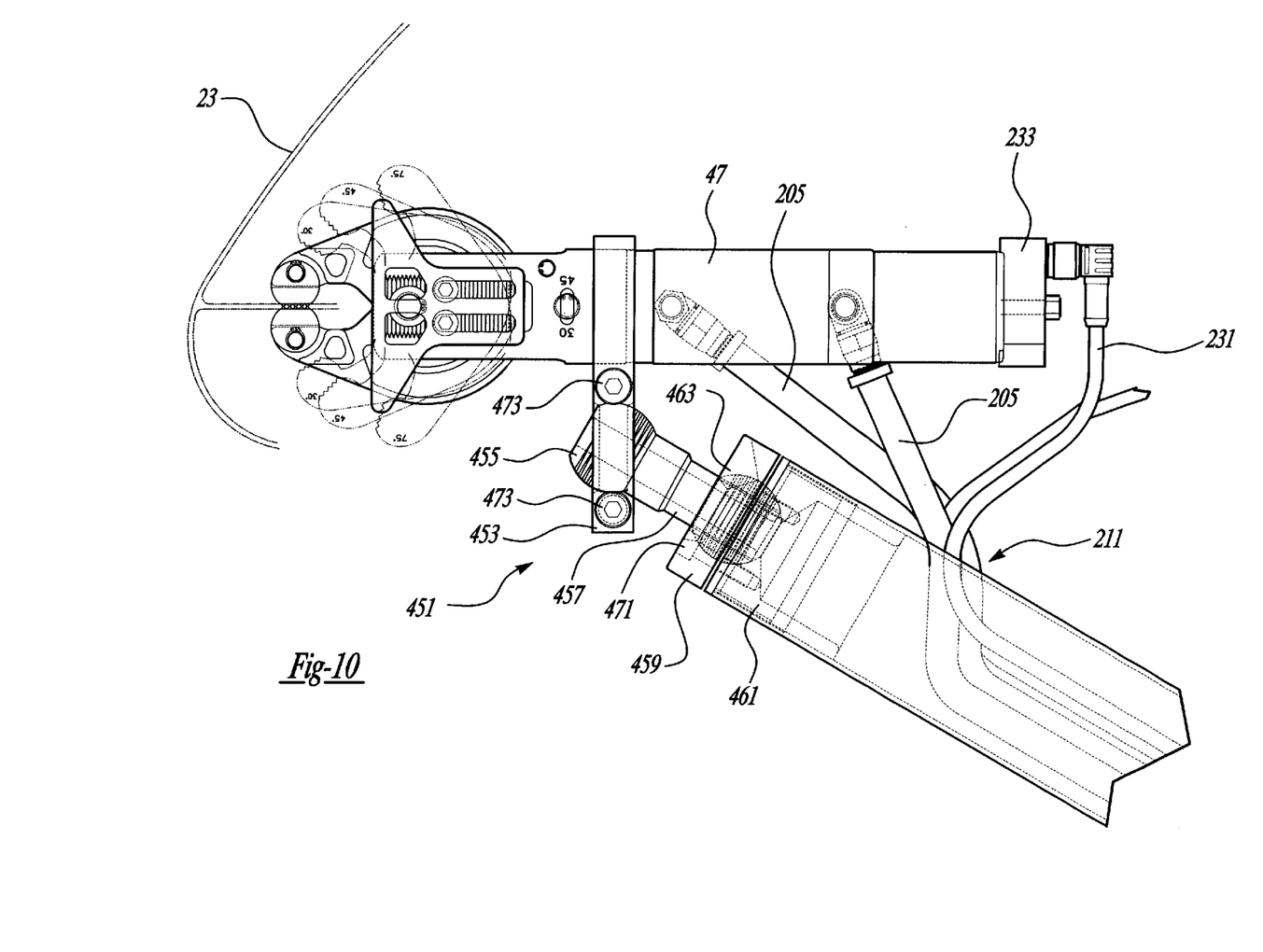
FIG. 10 is an enlarged side elevational view showing the workpiece interfacing tool, a tool mount and the arm employed in the preferred embodiment end arm manipulator.

Referring now to FIGS. 3, 6 and 10, each arm 37 is hollow and MIG welded to a corresponding ball 35 aligned with a first hole 201 in ball 35. Ball 35 is made as two separate and generally semi-spherical spun halves that are TIG welded together at TIG weld 203. Arms 37 and balls 35 are both made of steel. For each workpiece interfacing tool 47, two pneumatic lines 205 are routed from manifold portion 141, up through a lower hole 207 in base 31 and through a second downwardly facing hole 209 in ball 35. Pneumatic lines 205 are then routed in arm 37 and are allowed to exit through a laterally extending aperture 211. These pneumatic lines are then coupled to each fluid powered tool 47 for automatically and remotely activating the tool to grip or disengage workpiece 23. One or more electrical lines 231 are routed from box 123, up through hole 207, hole 209 and then in arm 37. Electrical lines 231 also exit arm 37 through aperture 211 and are then connected to a Turck switching or position sensing unit 233 mounted to tool 47.

Figure 8:
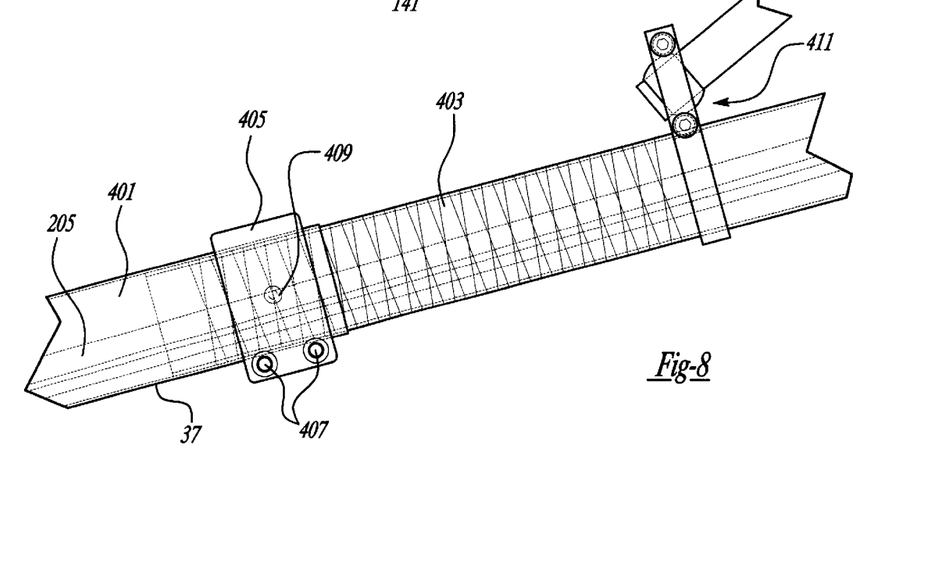
FIG. 8 is an enlarged and fragmentary side elevational view showing an arm, tube clamp and tool mount employed in the preferred embodiment end arm manipulator.

FIG. 8 illustrates the telescopic nature of arm 37. Arm 37 includes a proximal arm section 401 and a distal arm section 403. Distal arm section 403 has a slightly smaller outside diameter as compared to the inside diameter of proximal arm section 401. Thus, distal arm section 403 can be longitudinally slid into and out of proximal arm section 401 depending upon the desired set up length. Furthermore, distal arm section 403 can be rotated relative to proximal arm section 401 depending again upon the desired set up positioning; 360° distal arm section rotational movement is allowed. A tube clamp 405 engages the outside surface of proximal arm section 401 and serves to maintain the desired set up position of distal arm section 403 relative to proximal arm section 401 by tightening of screws 407. Four inwardly extending tabs of tube clamp 405 serve to slightly compress and crush the adjacent area of proximal arm section 401 thereby frictionally engaging a roughened outside diameter surface of distal arm section 403. If necessary, a dowel pin 409 or screw can additionally secure the arm sections relative to each other. FIG. 8 also shows an intermediate arm positioning of a tool mount 411 along a generally middle or intermediate portion of arm 37.

Figure 9:
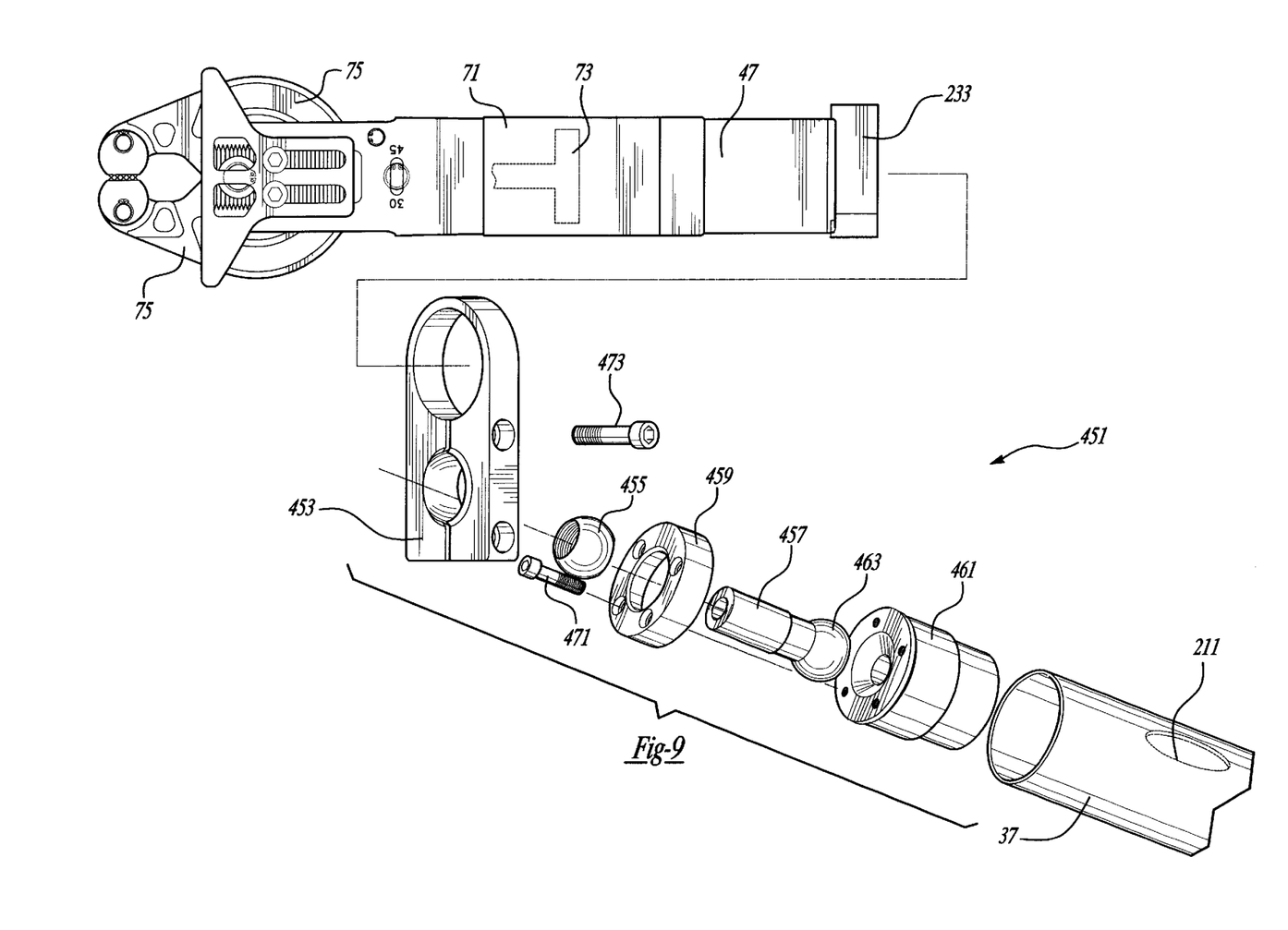
FIG. 9 is an exploded perspective view showing the tool mount and a side elevational view showing a workpiece interfacing tool employed in the preferred embodiment end arm manipulator.

An exemplary tool mount 451 is shown in FIGS. 9 and 10. Mount 451 includes a ball and socket joint defined by a mount 453, a grooved first ball 455, a swivel rod 457, a mount ring 459, a mount plug 461 and a second grooved ball 463. Second ball 463 is integrally machined as part of rod 457. Mount plug 461 is fastened to a distal end of arm 37. Bolts 471 serve to secure mount ring 459 to mount plug 461 thereby compressing and maintaining second ball 463 in its finally adjusted pivotal orientation. Similarly, bolts 473 are secured to maintain mount 453 in its final desired set up position relative to the previously pivoted first ball 455 while also maintaining mount 453 in its desired angular and linear relationship relative to tool 47. These mount parts are machined from aluminum or steel with various oxide or hard coatings.

While the preferred embodiment of the end arm manipulator has been disclosed, it will be appreciated that various other embodiments may be employed without departing from the present invention. For example, the distal end ball and socket tool mounting arrangement can be employed independently of the rest of the invention. Furthermore, any number of ball, arm and clamp ring combinations can be employed with a single base; for example, it is envisioned that two, four and six arm to base combinations would be desirable for many factory applications. Moreover, hydraulic fluid, pneumatic fluid or electrically powered tools of any variety can be mounted to the present invention construction. For example, welding guns or riveting machines can be used. Various materials and fasteners have been disclosed in an exemplary fashion, however, other materials and fasteners may of course be employed. It is intended by the following claims to cover these and any other departures from the disclosed embodiments which fall within the true spirit of this invention.

The invention claimed is:

1. An end arm manipulator for use in a manufacturing plant, the manipulator comprising:
   a base acting as a fluid distributing manifold;
   a first arm pivotably mounted directly on said base, said first arm being pivotable in at least two planes and being telescopically extendable;
   a first workpiece interfacing member coupled to said first arm, said first workpiece interfacing member being movably actuated by fluid pressure;
   a flexible and fluid carrying line extending from said base to said first workpiece interfacing member through an interior of said first arm;

a second arm pivotably mounted on said base, said first and second arms being pivotable independently of each other, at least one of said arms having an elongated dimension greater than any unidirectional dimension of said base; and a second workpiece interfacing member coupled to said second arm;

at least one of said arms being moveably secured to said base in a fixed angular position until said at least one arm is manually reoriented relative to said base.

2. The manipulator of claim 1 wherein said first workpiece interfacing member is movably coupled to said first arm and is movable in at least two directions relative to said first arm.

3. The manipulator of claim 2 further comprising at least one ball and socket joint coupling said first workpiece interface member to said first arm.

4. The manipulator of claim 3 wherein said at least one ball and socket joint couples said workpiece interface member to a distal end of said first arm.

5. The manipulator of claim 3 wherein said at least one ball and socket joint couples said first workpiece interface member to an intermediate portion of said first arm.

6. The manipulator of claim 1 further comprising a substantially spherical ball mounted to a proximal end of said first arm adjacent to said base, said ball being coupled to said base.

7. The manipulator of claim 6 further comprising a clamp ring mounted to said base for securing said ball to said base in a desired one of a plurality of angular positions.

8. The manipulator of claim 7 further comprising a cavity in said base and a cavity in said clamp ring having shapes substantially conforming to the adjacent portions of said ball, said clamp ring being adjustably secured to said base in a desired one of a plurality of different positions, said first arm extending through an opening in said clamp ring.

9. The manipulator of claim 1 wherein said first workpiece interfacing member is a workpiece engaging gripper.

10. The manipulator of claim 9 wherein said gripper includes:
a body;
a pair of gripping jaws, at least one of said jaws being movable relative to said body; and
a fluid actuated piston located in said body for opening and closing said at least one of said jaws.

11. The manipulator of claim 1 further comprising:
an extension securing mechanism; and
a first section of said first arm telescopically extendable from a second section of said first arm;
said extension securing mechanism selectively maintaining said sections of said first arm relative to each other in a desired extension position.

12. The manipulator of claim 1 wherein said first and second arms have a cylindrical shape and are substantially hollow.

13. The manipulator of claim 1 wherein said second workpiece interfacing member is a locator pin.

14. The manipulator of claim 1 wherein said second workpiece interfacing member is a vacuum cup.

15. The manipulator of claim 1 wherein said second workpiece interfacing member is a workpiece sensor.

16. The manipulator of claim 1 further comprising a robotic member mounted to and moving said base.

17. The manipulator of claim 1 further comprising at least third and fourth arms pivotably mounted to said base, at least said first and second arms radially extending directly between said base and said respective first and second workpiece interfacing members.

18. A workpiece interfacing apparatus comprising:
a first telescopic arm having a first ball;
an automatically powered gripper coupled to said first arm;
a base having first and second cavities, said first ball being disposed in said first cavity;
a flexible line passing from said base, through said ball and to said gripper;
a clamping member mounted to said base for retaining said first ball in said first cavity, said clamping member being reorientable to allow alternate positioning of said first arm; and
a second arm having a second ball disposed in said second cavity of said base.

19. The apparatus of claim 18 further comprising at least one ball and socket joint coupling said gripper to said first arm.

20. The apparatus of claim 19 wherein said at least one ball and socket joint couples said gripper to a distal end of said first arm.

21. The apparatus of claim 19 wherein said at least one ball and socket joint couples said gripper to an intermediate portion of said first arm.

22. The apparatus of claim 18 wherein said first arm has a cylindrical shape and is substantially hollow.

23. The apparatus of claim 18 further comprising at least a third arm pivotably mounted to said base, wherein at least said first arm radially extends directly between said base and said gripper.

24. The apparatus of claim 18 wherein said clamping member has a C shape.

25. The apparatus of claim 18 wherein said first ball has a first hole aligned with said first arm and a second hole offset from said first hole for receiving said flexible line.

26. The apparatus of claim 18 wherein said clamping member is movable to a first position relative to said base to limit said first arm to a first pivotable range of movement, said clamping member is subsequently movable to a second position to limit said first arm to a second pivotable range of movement.

27. A workpiece interfacing apparatus comprising:
a first telescopic arm having a first ball;
an automatically and fluid powered gripper coupled to said first arm;
a base having first and second cavities, said first ball being disposed in said first cavity;
a flexible line passing from said base, through said first ball and to said gripper;
a clamping member mounted to said base operably retaining said first ball in said first cavity, said clamping member being reorientable to allow alternate positioning of said first arm;
said clamping member being movable to a first position relative to said base to limit said first arm to a first pivotable range of movement if said first arm is moveable, and said clamping member being subsequently movable to a second position to limit said first arm to a second pivotable range of movement if said first arm is moveable;
a second arm having a second ball disposed in said second cavity of said base;
a manifold located in said base, said flexible line being coupled to said manifold; and fluid flowable from said manifold, internally through said first arm and to said gripper regardless of the pivoted position of said first arm.

28. An end arm manipulator comprising:
   a base;
   a substantially straight first arm having a pivot portion pivotably engaging said base;
   a powered gripper;
   a ball and socket assembly coupling said gripper to said first arm;
   a clamp mounted to said base for securing said pivot portion to said base in a desired one of a plurality of fixed angular positions, said pivot portion having a pivot point always being in a substantially constant and fixed location relative to said base;
   a first section of said first arm extendable and rotatable relative to a second section of said first arm;
   at least second, third and fourth arms pivotably mounted to said base, all of said arms being pivotable independent of each other; and
   a second workpiece interfacing member coupled to said second arm.

29. The manipulator of claim 28 further comprising a robotic member directly mounted to said base, said first arm radially extending between said base and said gripper in a substantially straight manner.

30. An apparatus for use with a workpiece, said apparatus comprising:
   an automatically powered workpiece gripper having a substantially cylindrical body;
   a mount securable to said body;
   a first ball coupled to said mount;
   a first member disposed against a first portion of said first ball;
   a second member disposed against a second portion of said first ball, said first ball being compressibly maintained in a desired orientation between said members when said members are fully secured together;
   a second ball and a rod coupling said mount to said first ball;
   a base having a fluid distributing manifold and a partially spherical cavity; and
   an arm pivot located on an end of said arm disposed in said cavity of said base;
   an elongated and telescopically extendable arm, said second member being secured to said arm;
   said gripper being adjustable relative to said arm prior to securing together said members.

31. The apparatus of claim 30 further comprising a substantially C-shaped clamp ring mounted to said base for maintaining said arm pivot and said arm in a selected pivotal position relative to said base.

32. The apparatus of claim 30 wherein said second member includes a substantially spherical cavity for receiving said first ball and a cylindrical structure located adjacent an end of said arm.

33. An end arm manipulator comprising:
   a factory floor mounted robotic member;
   a base coupled to said robotic member;
   a first arm pivotably mounted directly on said base;
   a flexible line located inside of said first arm;
   a first workpiece interfacing member coupled to said first arm;
   a second arm pivotably mounted on said base, said first and second arms being pivotable independently of each other;
   a second workpiece interfacing member coupled to said second arm; and
   a third arm pivotably mounted on said base, wherein an end of said third arm located closest to said base is offset from a line extending between ends of first and second arms located closest to said base; and
   an automotive vehicle panel secured to at least one of said workpiece interfacing members.

34. The manipulator of claim 33 wherein said base includes a support-receiver located substantially between said ends of said first and third arms, said member is attached to said base at said support-receiver.

35. The manipulator of claim 28 wherein a pivot point for each of said second, third and fourth arms is always in a substantially constant and fixed respective location relative to said base.

36. An apparatus comprising:
   a workpiece interfacing tool;
   a ball and socket assembly;
   a first elongated arm coupled to said tool by said ball and socket assembly;
   a ball mounted adjacent an end of said first arm;
   a base having a fluid distributing internal manifold and a partially spherical cavity, fluid operably flowing from said manifold, internally through said ball and through at least part of said first arm;
   a clamp adjustably securing said ball to said cavity of said base;
   said first arm being pivotable relative to said base prior to complete securing of said clamp to said base, said first arm adjustably securing said tool to said base; and
   a pivotable second arm adjustably secured to said base.

37. The apparatus of claim 36 further comprising a second ball mounted to an end of said second arm, said base having a second partially spherical cavity operable to receive said second ball, said tool being a fluid powered gripper, each of said arms being pivotable in at least two planes.

38. The apparatus of claim 36 further comprising fluid operably flowing from said manifold of said base to said tool, travels at least partially inside said first arm and fluid operably flowing inside said second arm.

39. A workpiece interfacing apparatus comprising:
   a telescopic arm having a ball;
   a fluid powered workpiece gripping mechanism coupled to said arm;
   a base having a cavity, said ball being located in said cavity;
   a flexible line passing from said base, through said ball and to said gripping mechanism;
   a clamping member mounted to said base operably retaining said ball in said cavity, said clamping member being reorientable to allow alternate positioning of said arm;
   said clamping member being movable to a first position relative to said base to limit said arm to a first range of movement if said arm is moveable, said clamping member being subsequently movable to a second position to limit said arm to a second range of movement if said arm is moveable;
   a manifold located in said base; and
   fluid flowable from said manifold, internally through said arm and to said gripping mechanism regardless of the position of said arm.

* * * * *